Patented Apr. 28, 1936

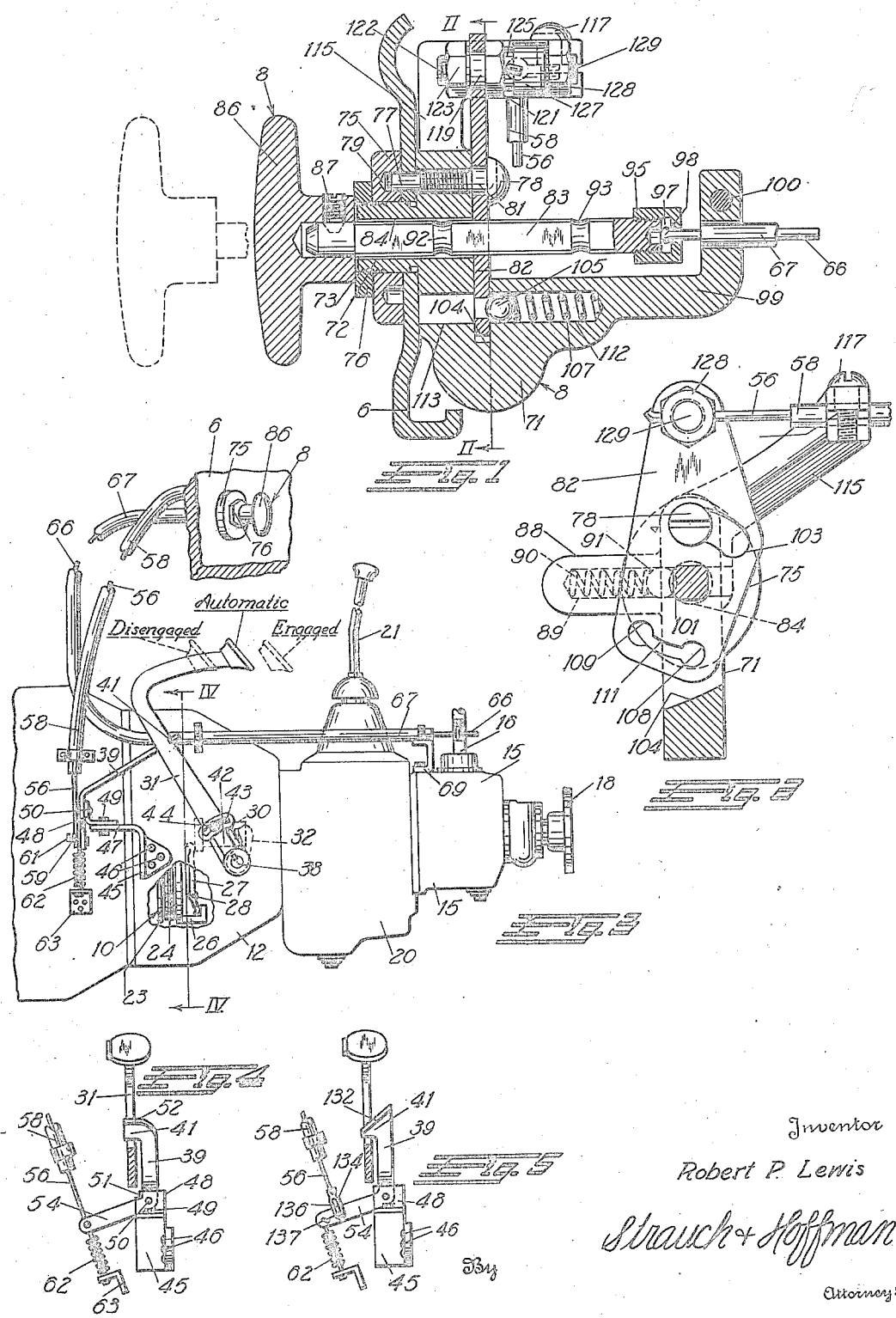

2,039,093

UNITED STATES PATENT OFFICE 2,039,093

POWER TRANSMISSION CONTROL MECHANISM

Robert P. Lewis, Toledo, Ohio, assignor to Automatic Drive & Transmission Company, New York, N. Y., a corporation of New Jersey Application March 31, 1933, Serial No. 663,784
Renewed September 25, 1935

4 Claims. (Cl. 74—502)

This invention relates primarily to control of a plurality of mechanisms combined in the propulsion system of a motor vehicle. More specifically, it relates to a novel manual control means adapted to be mounted on a motor vehicle in a position conveniently accessible to an operator thereof to provide for independent manipulation of a plurality of movable elements from a single manually operable control member.

In motor vehicles provided with a single direction drive clutch of the free wheel type having a device for locking the clutch members in fixed engagement, and an automatic clutch which may be governed as to its mode of operation by a control pedal so that it may be manually engaged or disengaged, with provision for retaining the control pedal in a certain position within the limits of its range of movement so as to provide for automatic operation of the clutch, an arrangement for conveniently operating the locking device for the free wheeling clutch and for controlling the means for retaining the clutch pedal in "automatic" position, is provided by the present invention. One type of automatic clutch contemplated is disclosed in the co-pending application of Wade Morton and William E. Haupt, Serial Number 595,184, filed February 25, 1932 and assigned to the assignee of the present invention.

Accordingly, it is a primary object of the present invention to provide a common operating means for independent operation, from a single manipulating member, of a plurality of control members associated with some of the mechanisms of a motor vehicle.

A further object of my invention is to provide a common operating means for operating, from a single manually controlled member, a position-retaining means for a clutch control member and a clutch member-locking means for a unidirectional clutch.

Another object of the present invention is to provide novel means for automatically retaining the control member of an automatic clutch mechanism in position to permit automatic operation of the clutch upon movement of the control member through a portion of its range of movement, in combination with means for releasing the retaining means to permit or cause return of the control member to one or more non-automatic positions in its range of movement.

Still another object of the present invention is to provide novel means biased for movement to a position for retaining the control member of an automatic clutch mechanism in a certain position within the limits of its range of movement.

A further object of the present invention is to provide retaining means for cooperation with a control member of an automatic clutch mechanism, biased for movement in a direction for retaining the control member in a given position within its range of movement, and including a cam surface or the like enabling the control member to be moved, from another position within its range of movement, into operative retaining engagement with the retaining means.

A still further object of the present invention is to provide retaining means for cooperation with a control member of an automatic clutch mechanism, biased for movement in a direction for retaining the control member in a selected position and including a cam surface for enabling the control member to be moved to the selected position from another given position within its range of movement, and separate means for moving the retaining means out of the position to which it is biased to permit return of the operating member to said given position.

Still another object of the present invention is to provide retaining means for cooperation with a control member of an automatic clutch mechanism, biased for movemnt in a direction for retaining the control member in a selected position, and including a cam surface whereby it may be moved from the position to which it is normally biased for engagement with the control member as the control member moves toward the selected position, and manually controlled means connected to the retaining means through a lost motion connection so that the manual controlling means may remain stationary as the control member engages with the cam surface of the biasing means to move it from its biased position.

Another object of the present invention is to provide a novel unitary controlling device which may be readily fixed to a conveniently accessible portion of a motor vehicle.

Still another object of my invention is to provide a novel unitary controlling device embodying a manually operable member supported for special rotation and reciprocation to operate separate control members through suitable connections, one control member being operated by reciprocation of the manually operable member and the other connection being operated by rotary movements of the manually operable member.

Still another object of my invention is to provide a novel controlling device embodying a single manually operable member supported for several distinct movements, with means for retaining the member in several predetermined positions in the range of said movements.

A still further object of my invention is to provide a novel unitary controlling device comprising a unitary frame adapted to receive a member partially journaled therein, for reciprocation longitudinally and rotation through an angle, by manipulation of the portion of the member which projects beyond its bearing in the frame.

Further and more specific objects of the present invention will become apparent from the following description when studied in connection with the accompanying drawing and the appended claims.

In the drawing:

Figure 1 is a longitudinal sectional view of a preferred embodiment of the control operating device of my invention.

Figure 2 is a detail view in cross-section taken on line II—II of Figure 1, in the direction of the arrows.

Figure 3 is a view in side elevation and on reduced scale, illustrating somewhat diagrammatically an automatic clutch in combination with a transmission and free wheeling unit, and showing a control arrangement therefor in accordance with the present invention. The device of Figures 1 and 2 is assembled in slightly distorted position in this view for the sake of clarity.

Figure 4 is a fragmentary view in section taken on line IV—IV of Figure 3 in the direction of the arrows.

Figure 5 is a fragmentary view of a modified form of that control arrangement illustrated in Figures 3 and 4.

The remote control device of Figures 1 and 2 will be hereinafter described as controlling in a novel manner a plurality of control elements associated with the driving system of a motor vehicle. While I have chosen to illustrate my invention in connection with the controls of an automatic clutch and a free wheeling unit, it is to be understood that the invention is not specifically limited thereto, but will have general utility for the remote operation of two movable control members of any kind.

Referring to the drawing in detail, numeral 6 represents the instrument panel or other portion of a motor vehicle conveniently accessible to the operator thereof. This panel carries a controlling device generally indicated by the numeral 8 and the structural details of which will clearly appear as the description proceeds. In Figure 3, there is illustrated a power transmission system for a motor vehicle, certain of the elements of which are controlled in a novel manner from the control device 8.

An automatic clutch 10,—of the character described in the co-pending application referred to previously or of that disclosed in the application of William E. Haupt, Serial Number 488,757—is operatively carried in clutch housing 12. A casing 15 houses a free wheeling unit of the type having an overrunning clutch mechanism with means for positively engaging the power transmitting element of the free wheeling clutch under control of an operating lever 16. Movement of lever 16 to the left locks out the free wheeling feature, and a direct driving connection to the vehicle wheels thereby is secured. The lever 16 is under manual control from the device 8 in a manner later set forth. Coupling member 18 may be connected to the driven axle in any suitable manner as by a propeller shaft.

A conventional change speed transmission 20, having a shifting lever 21 is interposed in the drive system between the free wheel clutch and the clutch 10.

A clutch pedal 31 is mounted on a clutch throwout shaft 38 for oscillation between the two broken line positions marked "Engaged" and "Disengaged" in Figure 3. The pedal also has an intermediate or normal position, marked "Automatic", in which it may be held by the hook 41 of a swinging latch member 39 after depression of the pedal against the resistance of any conventional retracting spring. Pivotal movement of the latch member is accomplished by manual operation of the control device 8 in a manner later set forth. For the sake of clarity, it may be mentioned at this time that when the pedal is latched in "automatic" position, the clutch 10 engages and disengages entirely automatically in response to variations in engine speed; that when the pedal is in "engaged" position the clutch is firmly engaged regardless of engine speed; and that when the pedal is in "disengaged" position the clutch is disengaged regardless of engine speed.

In order to establish the proper working relationship between the latch 39, the pedal 31 and the clutch control shaft 38, so as to ensure automatic clutch operation when the pedal is latched, the shaft 38 carries an arm 42 which is keyed or otherwise suitably secured thereto, an arcuate slot 43 being formed in a segmental portion of the arm 42, and the pedal being rotatably mounted on shaft 38 and may be clamped to arm 42 for proper adjustment into different relative angular positions by means of clamping bolt 44.

In order to control the automatic clutch mechanism in response to movement of the clutch pedal, the shaft 38 carries a fork 32 which oscillates therewith to cause longitudinal shifting movement of a clutch throwout sleeve and bearing assembly 30 that is carried on the usual throwout support located in the housing 12. The sleeve and bearing assembly bear against the inner ends of a set of radial fingers 27 which are pivoted intermediate their ends at 28 on an extension (not shown) of the flywheel of the engine.

A suitable automatic clutch contemplated for use in the housing 12 is disclosed in full detail in the aforementioned co-pending application Serial Number 595,184, and hence the preceding description, when taken with the following brief outline of the clutch structure and its mode of operation, should suffice to clarify those features of clutch operation which are pertinent to the control system of the present invention.

The outer ends of the fingers react rearwardly against the flanged edge of a clutch backing plate 26 which is mounted for synchronous rotation with the engine flywheel and axially movable relative to the latter. Yielding means constantly urges the backing plate forwardly as far as permitted by the fingers 27 and hence its axial position at any time depends rather closely upon the position of the pedal 31.

Another plate 23, aptly called the automatic plate because it is shiftable axially in response to variations in engine speed, rotates synchronously with the flywheel. Between the plates 23 and 26, there is disposed a driven plate or disc 24, axially splined on the usual driven clutch shaft which transmits the driving power of the engine to the transmission mechanism 20. The three friction plates cooperate to establish clutch engagement and disengagement, as follows.

With the pedal 31 latched in "automatic" position and the adjusting nut 44 properly set, the fingers 27 permit the backing plate 26 to be urged forwardly to such position that when the engine is operating at speeds substantially above idling speed, centrifugal means can urge the automatic plate 23 rearwardly to thrust the driven plate 24 into frictional engagement with said backing plate and thus establish a drive. However, the backing plate position is such that, when the engine speed is substantially at or below idling, the plates are disengaged. The clutch therefore is entirely automatic in the illustrated full line position.

In order to obtain clutch engagement when the engine is idling or dead—as may be desirable for purposes of utilizing the engine as a brake or for towing the vehicle to start the engine—the latch 39 may be released to permit the pedal to move rearwardly to "engaged" position. Upon this rearward pedal movement, the fingers 27 permit the backing plate 26 to be thrust so far forwardly that the three plates are frictionally engaged. At this time, the automatic plate 23 is in its extreme forward position and hence can not operate automatically to establish a clearance in the plate assembly.

It may be desired to release the clutch when the engine is operating at speeds substantially above idling speed, but this cannot be accomplished in the "automatic" and "engaged" positions just discussed. However, by manually depressing the pedal to the illustrated "disengaged" position, the fingers 27 will thrust the backing plate 26 so far rearwardly that the automatic plate 23 will reach its own limit of rearward motion without clamping the driven plate 24 in clutching engagement.

With pedal 31 in the automatic position and control member 16 of the free wheeling unit in the operative free wheeling position, the transmission mechanism has no driving connection at either end with any of the moving parts until the engine is accelerated. When the engine throttle is closed, with the lever 16 in operative free wheeling position, shift lever 21 may be readily moved to select the desired gear ratio.

When the vehicle is traveling at high speed and it is desired to use the engine as a brake by driving it from the road wheels, lever 16 may be moved to its lockout position to lock the free wheeling overrunning clutch. A direct drive is thus established from the rear wheels to the engine until the engine drops below idling speeds.

The latch member 39 is pivotally carried from support 45 which may be secured in any suitable manner to housing 12, for example by screws or bolts 46. Support 45 includes a unitary forwardly extending arm 47 to which bracket 48, which serves as the pivotal support for latch 39, is connected in any suitable manner. In the illustrated embodiment, bracket 48 is adjustably secured to arm 47 of the support by a bolt 49 which extends through elongated apertures in the bracket and the support to provide for adjustable movement of member 48. Latch 39 is pivotally connected to member 48 by any suitable means, as pivot pin 50. An inwardly bent stop 51 is formed on the vertical arm of bracket 48 to prevent movement of the latch member beyond its pedal engaging position.

The pedal engaging hook 41 at the upper end of latch member 39 has an upper edge 52 which extends at approximately a right angle to the plane of movement of pedal 31 for a purpose to be described.

The end 54 of latch 39 forms an obtuse angle with the body portion on which hook 41 is formed. The pivot point 50 of the latch member lies substantially at the intersection of end 54 and the body portion of the latch. Control wire 56 of Bowden cable 58 is fixed in any suitable manner to the end 54 of the latch member, for example by apertured post 59 and thumb screw 61. A spring 62 is connected to end portion 54 of the latch to bias the latch member into position for engagement with pedal 31. A slight amount of slack in control wire 56 is permissible as stop 51 previously described checks the movement of latch member 39 beyond its pedal engaging position. Spring 62 may be hooked over post 59 with its opposite end connected by bracket 63 to the rear end of the engine housing.

As previously stated, clutch pedal 31 may be held in its full line or automatic position by hook 41 of the latch member. Hook 41 may be released from engagement with the pedal to permit the pedal to move to the right hand dotted line or engaged position by exerting a pull on control wire 56, which will move the latch member 39 in a clockwise direction about pivot point 50, as viewed on Figure 4, to move hook 41 to the right out of engagement with pedal 31.

If the pull on control wire 56 is released, spring 62 will return latch member 39 to the position shown in the drawing in which it will be held by stop 51. Horizontal edge 52 prevents clockwise movement of the latch if pedal 31 is moved toward its automatic position to avoid distortion of cable 58 and damage to the cable operator.

Control lever 16 is operated from a remote point by control wire 66 of Bowden cable 67, which is supported on bracket 69 mounted on the housing 15 of the free wheeling device.

The controlling device 8 is used to operate control wires 56 and 66 independently from a single manually controlled member. Referring now to Figures 1 and 2, said device 8 comprises a unitary frame member 71 on which is formed a cylindrical boss or projection 72 externally threaded at its outer end as indicated by numeral 73. Frame 71 is secured to the instrument panel 6 or other convenient portion of the motor vehicle by insertion of boss 72 from the rear of panel 6 into a suitable panel aperture which may be slightly larger than the external diameter of the boss. Cover plate 75, which may be elliptical in outline as shown in Figure 2 or of other ornamental configuration, fits over boss 72 in contact with instrument panel 6, against which it is clamped by nut 76 which engages thread 73. Cover plate 75 is positioned with respect to the instrument panel by reduced end 77 of guide screw 78 which extends through the instrument panel and enters a recess 79 formed in the cover plate. Cover plate 75 is preferably provided with a series of recesses 79 spaced at circumferential intervals on a circle the radius of which is equal to the distance of the center of screw 78 from the center of boss 72.

Screw 78 is threaded into an aperture in body portion 71, the enlarged portion 81 serving to guide oscillating arm 82 in a manner to be more fully described. The end of enlarged portion 81 provides a shoulder which positions screw 78 longitudinally in frame 71.

Control operating member 83 is slidably and rotatably received within cylindrical bore 84 of body 71 and is provided at its outward end with a knob 86 of any desired form so that it may be conveniently grasped by the hand of an operator. The knob is preferably elongated as shown by Figure 3, or provided with an indicating mark so that when it is rotated, its angular position will be indicated either by the position of its major axis or by said mark. Control member 83 is received within a recess in the knob and is secured by suitable means, as set screw 87.

A detent spring receiving chamber 88 projects from body 71 and receives coil spring 89 within a longitudinal bore 90. Ball detent 91 seats in grooves 92 or 93 in control member 83 under the influence of spring 89 to retain the member in the position to which it may have been moved longitudinally by knob 86.

The end of member 83 opposite knob 86 is threaded to receive swivel nut 95. Aperture 97 in swivel nut 95 is slightly larger in diameter than control wire 66. After insertion through aperture 97 of swivel nut 95, an enlargement indicated at 98 is formed on the end of control wire 66 in any suitable way for example by spreading the strands of the wire and applying solder or other molten metal thereto. If the control wire to be used is a solid wire, its end may be upset slightly. Nut 95 can then be threaded over the end of control member 83, the knob 98 on the control wire causing a pull to be transmitted when member 83 is moved to the left, but permitting relative rotation between member 83 and wire 66.

Arm 99 of frame 71 extends parallel to the control member 83 beyond its limit of inward movement. The right angled end of arm 99 is apertured to receive control cable 67 and is bifurcated beyond the aperture. The bifurcations of the arm are clamped together to hold control cable 67 firmly in its aperture in the arm by means of screw 100 which threadedly engages one of the apertures.

The opening in the instrument panel which receives the end 77 of guide screw 78 may be located in any position about the center of the aperture which receives the boss 72 so that the control device 8 may be mounted in any desired angular position, depending on the desired arrangement of the control cables 58 and 67 in the vehicle. As previously described, cover plate 75 is preferably recessed at several points 79 so that its major axis will be vertical irrespective of the angular position of frame 71.

Knob 86 may be secured to control member 83 so that with the parts in the position illustrated, the major axis of knob 86 will coincide with the major axis of cover plate 75. The relative position of cover plate 75 and knob 86 will then be an indication of the position of the controlling members regardless of the angular position selected for the installation of the frame 71.

Reciprocating member 83, when moved to the left as viewed in Figure 1, exerts a pull on control wire 66, which, if it is connected to freewheeling control lever 16, as illustrated by Figure 3, will move it to the left also. Ball detent 91 engages in groove 93 to retain the parts in position, the inner end of cap 95 serving as a stop to define the limit of the movement of control member 83 to the left. The hub of knob 86 abuts the outer face of nut 76 to define the inward limit of movement of member 83, where it is held by ball detent 91 engaging groove 92.

Member 83 is substantially square in cross-section between its threaded end and the end which receives control knob 86. The corners of the squared portion are slightly rounded as indicated by reference character 101, the radius of the arcuate surfaces being but very slightly less than the radius of bore 84 so that the member is journaled for rotation within the bore.

Oscillating control member 82 previously mentioned has a squared aperture of substantially the same configuration as the cross-section of the middle portion of control member 83 over which it fits. Member 82 is rotated about an axis coinciding with the center of its squared opening as control member 83 is rotated by reason of the interlocking engagement of the squared portion of member 83 within the squared aperture. An arcuate guide slot 103 receives enlarged portion 81 of the guide screw shank 78, which guides member 82 and fixes the extreme limits of its oscillation. A groove 104 in frame 71 serves as a guide for the free end of member 82 and assists in assembling the parts in a manner to be described.

Oscillating member 82 is maintained in either one of its extreme positions by means of ball detent 105, which is pressed by spring 107 against either one of apertures 108 and 109 which are smaller in diameter than ball 105. Apertures 108 and 109 are connected by an arcuate slot 111 which aids in releasing the ball detent as knob 86 is turned without affecting the firmness of the hold of the detent in either of the apertures. Ball 105 and spring 107 are received in cylindrical bore 112 in the forwardly extending arm 99 of frame member 71, which is in alignment with aperture 113 to permit insertion of the spring and the ball within bore 112 prior to the assembly of members 83 and 82 with frame 71.

Arm 115 of frame 71 extends radially from the central portion of the frame to a point opposite the free end of member 82 when it is positioned as shown by Figure 2. The end of the arm is apertured to receive control cable 58 and is bifurcated beyond the aperture. The bifurcations of the arm are clamped together to hold the control cable by clamping screw 117.

Control wire 56 is secured to the free end of member 82 so that as the member is oscillated in a counterclockwise direction, a pull is exerted on control wire 56 to move end 54 of the latch 41 to the left in Figure 3 to withdraw hook 41 from engagement with pedal 31.

A special bolt 119 comprises a hexagonal portion 121, a threaded end 122 which is received within an aperture in the free end of member 82 in which it is secured by nut 123, and a cylindrical portion 125. The latter is provided with a hole slightly larger in diameter than the diameter of control wire 56 which is inserted therein. Control wire 56 is secured in the hole in bolt 119 by means if cap member 127 which fits over cylindrical portion 125 of the bolt and is clamped against the wire by a nut 128 threaded over the reduced threaded end 129 of bolt 119.

The individual parts of the control device of this invention described above may be readily assembled in the following manner. Nut 95 is first slipped over the free end of control wire 66 which is exposed beyond cable 67, so that knob 98 may be formed on its end prior to the assembly operations about to be described. Spring 107 is introduced into cylindrical bore 112 in which it may be readily seated as this bore is in axial alignment with bore 113, (Figure 1). Member 82 is inserted from above as viewed in Figures 1 and 2 into slot 104, holding ball 105 in place against the pressure of spring 107.

Next in order is the introduction of spring 89 and ball detent 91 into cylindrical recess 90 which may be conveniently accomplished, as this recess extends beyond cylindrical bore 84 to the outside of frame 71. Reciprocable member 83 may now be introduced into bore 84 from the left as viewed in Figure 1 through the squared opening in member 82 which has been aligned with bore 84 when performing the assembling operation previously described. Guide screw 78 is now threaded into frame member 71 to retain the parts thus far assembled in the proper position.

Frame 71 and the parts assembled therewith are now ready for attachment to panel 6 by inserting boss 72 and the end 77 of the guide screw into suitable holes provided in panel 6. As previously explained, the apertures which are formed in panel 6 to receive the end 77 of the screw may be located so that control device 8 will rest back of the instrument panel in its most convenient position for ready connection of cables 58 and 67.

Cover member 75 is slipped over the exposed end of boss 72 after which frame 71 may be securely clamped against the panel by means of nut 76.

Handle 86 is applied over and secured to member 84 by set screw 87. The control device is assembled and in position on the vehicle ready for connection with control cables 58 and 67.

Control cable 67, to which swivel nut 95 has been previously applied, may be installed by inserting the free end of the cable which in this instance is to be connected to lever 16 through the aperture in the bifurcated end of arm 99. The control cable may now be passed for its entire length through the aperture in arm 99 until the end of sheath 67 is flush with one side of arm 99, after which it is clamped firmly in position by screw 100 which draws the bifurcations of the arms together. Nut 95 may now be threadedly engaged with the threaded end of control member 83.

By following the suggested method of applying control cable 67 to arm 99, a plurality of such cables of proper length can be made up in advance and fitted with nuts 95 with a saving of time and expense when installing the device on each individual vehicle.

Control cable 58 is inserted in the aperture between bifurcations of arm 115, after which it may be clamped in position by means of screw 117. Control wire 56 is then inserted into the hole in bolt 119 and cap member 127 is slipped over cylindrical shank portion 125 of the screw. The cap is clamped firmly against the control wire by nut 128 which engages the threaded end 129 of the bolt.

The operation of the unitary control device of this invention will now be described in connection with the operation of control lever 16 and latch member 31. However, it is to be understood that control cables 58 and 67 may be connected to any pair of members which are to be moved from a remote point.

To move control lever 16 from the full line position of Figure 3, handle 83 is pulled to the left to its dotted line position as shown on Figure 1. Control wire 66 is thus drawn to the left as viewed in Figure 1 or to the right as viewed in Figure 3 in which control device 8 is illustrated as being installed in a position 180° from the plane of the cross-sectional view of Figure 1. Device 8 is illustrated in Figure 1 in a position opposite to its position in Figure 3 for the sake of clarity.

Hook 41 of the clutch pedal latch member may be moved to the right as viewed in Figure 4 to release clutch pedal 31 by rotating knob 86 in a clockwise direction as viewed on Figure 3, or in a counter-clockwise direction as viewed in Figure 2. Rotation of knob 86 imparts rotary movement to member 82, which swings about the center of control member 83. The end of control wire 56 opposite the end which is secured to member 82 is drawn within the sheath of control cable 58 and moves end 54 of the latch member upwardly as viewed on Figure 4. Hook 41 moves to the right to release pedal 31 from its automatic position so that it may assume the engaged position previously described.

Horizontal edge 52 of hook 41 prevents reengagement of hook 41 with pedal 31 and thus protects control cable 58 from injury in the event that knob 86 is restored to its vertical position before pedal 31 has been depressed to its automatic position.

Figure 5 illustrates a slightly modified form of the invention illustrated by Figures 3 and 4. Referring to this figure, member 39 is pivotally mounted on bracket 48 which is adjustably carried by support 45, as previously described in connection with the description of the structure illustrated by Figures 3 and 4. Spring 62 acts to bias the upper portion of latch member 39 bearing pedal engaging hook 41 to the left as viewed in Figure 5. Hook 41 is provided with a steeply inclined edge indicated by numeral 132, which acts as a cam so that hook 41 will be displaced to the right as pedal 31 is moved from its extreme right-hand or engaged position toward the automatic position, after which biasing spring 62 will return the upper portion of detent member 39 to the left with hook 41 in engagement with pedal 31.

The means just described provide for automatically retaining clutch pedal 31 in its automatic full line position when it is moved from the extreme right-hand position.

In order to prevent twisting of control wire 56 and possible damage to the mechanism of control device 8, a lost motion connection of control wire 56 to latch 39 is provided.

The lost motion connection may take the form of a link 134 slotted as indicated at 136 with the slot in engagement with pin 137.

When the control device of this invention is used to control the modified latch member of Figure 5, spring pressed detent 105 may be omitted in which case control wire 56 may be directly connected to latch member 39 in the manner illustrated and described in connection with Figure 4. With this alternative arrangement, rotation of knob 86 will release pedal 31 from its automatic position and control wire 56 and knob 86 will return to the position illustrated by Figure 3 when the knob is released under the influence of spring 62. Pedal 31 may be returned to and held in its automatic position merely by moving it inwardly to a point at or beyond its automatic position. As the pedal approaches its automatic position, knob 86 will momentarily rotate in a clockwise direction as pedal 31 cams hook 41 to the right.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A device for operating a plurality of control means comprising a unitary frame having a projection adapted for connection to an apertured panel, said projection and the body of said frame being provided with an axially extending bore, a manually operable member extending beyond said projection journaled for rotation in said bore and movable axially to a plurality of positions, detent means seated adjacent said bore for retaining said manually operable member in any one of its positions, an oscillating member guided in a slot in said frame and operably engaged with said manually operable member to be oscillated thereby as said manually operable member is rotated, detent means seated adjacent said slot for retaining said oscillatable member in any one of its positions, and connecting means on said manually operable member and said oscillating member for connection to individual remote control means.

2. A device for operating a plurality of control means comprising a frame adapted to be mounted in a panel member, a plurality of extended arms on said frame having clamping means for a control cable, a manually operable member mounted for rotation and reciprocation in said frame, connecting means on said manually operable member for connection to a control wire slidable in a control cable clamped in one of said arms, a member guided in said frame for rotation by said manually operable member but restrained against axial movement, and connecting means on said rotatable members for connection to a control wire slidable in a control cable clamped in the other of said arms whereby said first and second mentioned control wires are actuated by reciprocatory and rotary movements of said manually operable member.

3. The invention as defined in claim 2 wherein detent means are provided in said frame for retaining said manually operable member in any one of a plurality of positions and other detent means are provided in said frame for retaining said rotatable member in any one of a plurality of positions.

4. A device for operating a plurality of control means comprising a unitary frame having a projection adapted for connection to an apertured panel, said projection and the body of said frame being provided with an axially extending bore, an apertured cover plate of irregular shape adapted to be received over said projection, a lock nut cooperating with threads on said projection to clamp said frame and said cover plate against opposite sides of said panel, a manually operable member mounted for rotation and reciprocation in said bore, an oscillating member operably engaged with said manually operable member to be oscillated thereby as said manually operable member is rotated, an arcuate guide slot in said oscillating member, and a member screw-threaded into said frame and projecting through said arcuate slot to guide said oscillating member, said screw threaded member extending through said panel and into one of a number of spaced recesses in said cover plate to prevent inadvertent rotation of said cover plate.

ROBERT P. LEWIS.